July 17, 1962     W. R. SNIDER     3,044,241
ROTARY MOWER
Filed Sept. 28, 1959           2 Sheets-Sheet 1
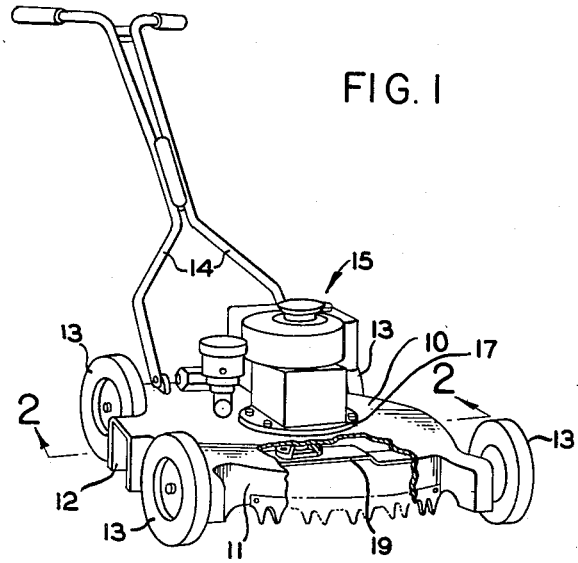
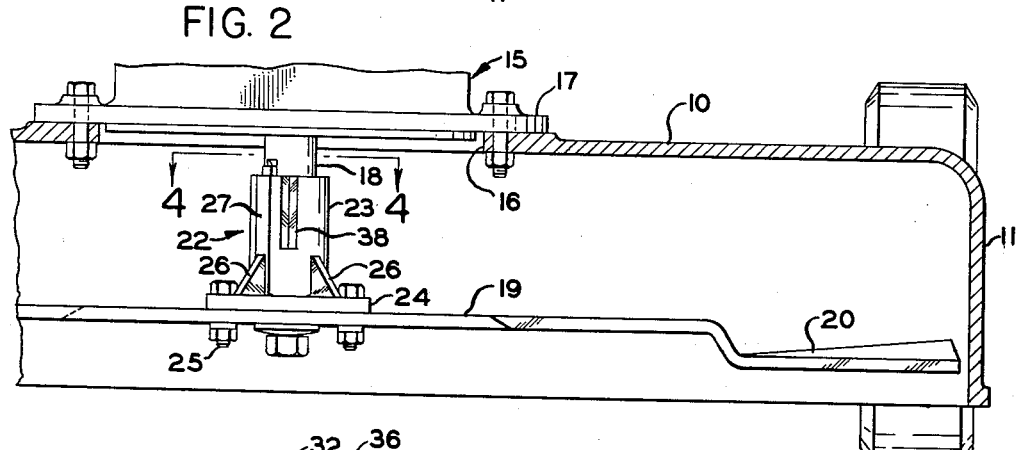
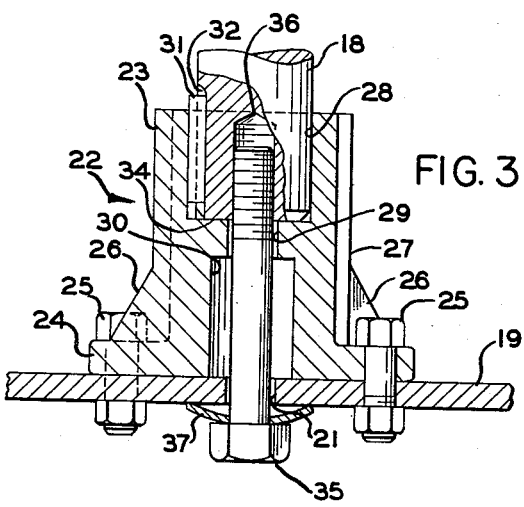
*INVENTOR.*
WILLIAM R. SNIDER
BY
*Oberlin, Maky & Donnelly*
ATTORNEYS July 17, 1962 W. R. SNIDER 3,044,241
ROTARY MOWER
Filed Sept. 28, 1959 2 Sheets-Sheet 2

*INVENTOR.*
WILLIAM R. SNIDER
BY
Oberlin, Maky & Donnelly
ATTORNEYS

United States Patent Office 3,044,241
Patented July 17, 1962

3,044,241
ROTARY MOWER
William R. Snider, Rock Creek, Ohio, assignor to The Great Lakes Tractor Company, Cleveland, Ohio, a corporation of Ohio
Filed Sept. 28, 1959, Ser. No. 842,749
4 Claims. (Cl. 56—295)

This invention relates as indicated to rotary mowers and more particularly to an improved blade drive assembly therefor.

As is well known, the motor or engine of a rotary mower is mounted on a deck having a depending wall or wall sections at its periphery forming an open-bottomed housing within which the cutting blade of the mower rotates. Ground-engaging wheels are suitably attached to the deck movably to support the same with proper clearance from the surface over which it may be moved, and the blade drive shaft extends vertically downwardly through the deck into the cutting chamber for attachment of the blade to the end of the same; where the power is derived from an internal combustion engine, the most common drive means used, such shaft is the crankshaft of the engine.

The blade is generally made in one piece, of substantial length, and attached centrally transversely to the free shaft end by means of a collar or hub, and there is inherent in such an assembly a considerable mechanical advantage in the transmission of a force applied near one of the blade ends to the drive shaft. The shaft should therefore be protected in some manner against the development of excessive torque therein as the result of the blade striking, while rotating, a stationary or relatively immovable object. Breakage of the shaft not only presents the problem of costly replacement and repair, but frees the blade and could result in the latter being thrown with consequent added damage and a definite risk to personal safety. The need for adequate protection against such an occurrence, while present in all rotary mowers, has been complicated by the demand for larger size mowers, since the forces to be taken into account increase considerably with lengthening of the distance between the blade end and the shaft or, in other words, the working radius of the mower. It has, for example, been estimated that the force developed in a twenty-one inch rotary mower when the blade thereof strikes an immovable object at a speed within its range of operation is roughly equivalent to a blow of about twenty-seven tons, while this figure may be as high as forty tons in the case of a similar occurrence in the operation of a twenty-four inch mower, the noted dimensions referring to the blade length or cutting diameter.

It is a primary object of my invention to provide a rotary mower having an improved drive connection of the cutting blade which safely and reliably protects the drive shaft against breakage and excessive torsional stress as the result of a blade hitting obstructions which are stationary, or substantially so, in operation of the mower.

Another object is to provide novel means for attaching such a blade to the drive shaft therefor, with such means shearing in response to the development of excessive torque therein.

It is also an object of the invention to provide a rotary mower in which the cutting blade is attached to the drive shaft by a novel hub specially formed to shear when subjected to torsional stress equal to or exceeding a predetermined value related to that at which the shaft may be damaged or fractured.

A further object of the invention is to provide a rotary mower in which the blade-attaching assembly includes means to protect against inadvertent pre-stressing of the connection to the drive shaft in the attaching operation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view of a rotary mower in accordance with the present invention and with certain parts broken away and shown in section;

FIG. 2 is an enlarged sectional view taken on the line 2—2 in FIG. 1;

FIG. 3 is a further enlarged section on the line 3—3 in FIG. 4;

Figure 4:
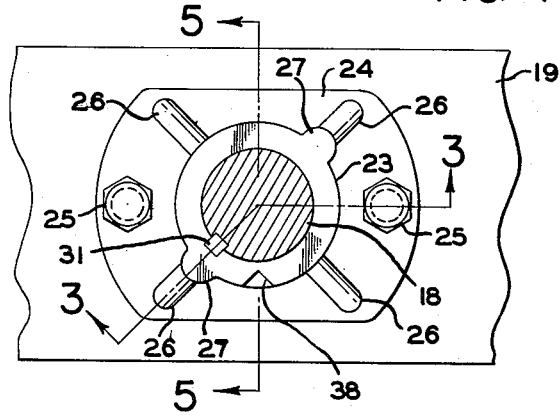
FIG. 4 is an enlarged section view taken along the line 4—4 in FIG. 2.
Figure 5:
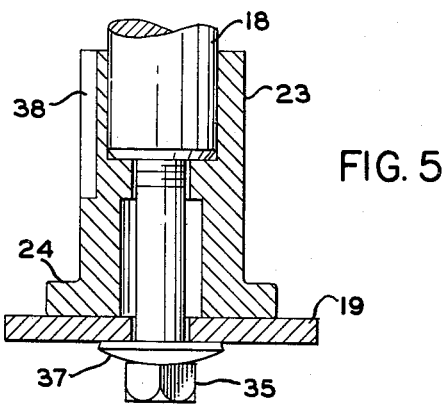
FIG. 5 is a sectional view taken on the line 5—5 in FIG. 4.
Figure 6:
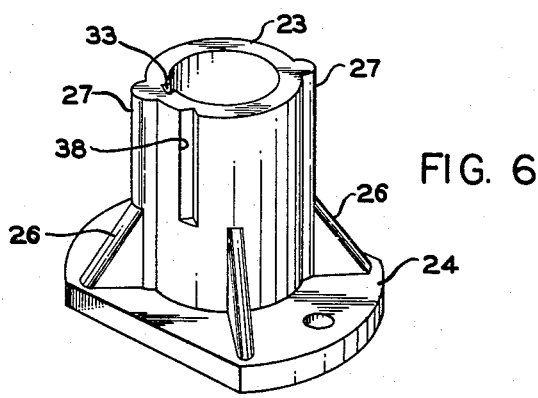
FIG. 6 is a perspective view of my new hub.

Referring now to the drawings in detail, the rotary mower illustrated in FIG. 1 represents a conventional type of such device with respect to over-all design and general organization of parts. Such mower comprises a generally circular deck 10 having a depending peripheral wall 11 which in this case is interrupted and extended slightly outwardly at one side to form a discharge chute 12 for clippings and the like. Wheels 13 are attached respectively at further extensions, which define four corners, and handles 14 are pivoted to the deck adjacent the rear pair of wheels for propelling and/or guiding the mower over the ground; the mower may be equipped with a wheel drive or manually propelled as desired.

Such mower also conventionally comprises a gasoline engine and the usual related equipment and controls, the engine assembly being designated generally by reference numeral 15 and being mounted on the upper surface of the deck 10, over a central aperture 16 therein, by means of a bolted down attaching plate 17. The drive shaft 18 of the engine emerges at the bottom and extends downwardly through the deck apertures 16 for attachment of the cutting blade 19 thereto. As indicated earlier, my invention is particularly concerned with such attachment of the blade, and accordingly a further detailed description of the structure and components noted thus far is not needed for full understanding of the nature and operation of the present improvements.

For a reason to be discussed hereinafter, I prefer to employ a cutting blade having downwardly off-set end or tip portions 20, as best shown in FIG. 2, the two ends being correspondingly formed. Such blade, which is shaped from a single, fairly heavy metal strip, is provided with a hole 21 at its longitudinal and transverse center, and a hub 22 is secured to the blade at this region.

The hub 22 is generally hat-shaped, with a generally cylindrical main section 23 and an integral, relatively enlarged and generally oblong base section 24. The latter section is disposed against the upper surface of the blade 19, with the axis of the cylindrical section 23 passing through the exact center of the blade, and the hub is secured in such position by two bolts 25 extending through the respective ends of the base section and the blade. A plurality of external braces 26 of triangular shape are formed in the hub externally between the base and cylindrical sections in peripherally spaced-apart relation to the last such section. Two of such braces intersect or merge with diametrically opposite rib-like protuberances 27 extending longitudinally at the outer surface of the cylindrical hub section.

The hub is hollow, with its inner surface shaped to define an upper end recess 28, an intermediate passage of substantially reduced diameter 29, and a lower end recess 30 of larger diameter than such passage but less than that of the upper end recess, the inner surface throughout the entire length being cylindrical about the centerline or axis of the hub. The upper end of the hub is fitted on the free end of the engine shaft 18, and the two are keyed for rotation together by means of a hub key 31 engaged in a keyway 32 provided in the shaft end and in a further way or slot 33 formed in the inner surface of the hub end. Sliding movement of the hub on the shaft in assembly is, as illustrated, limited by abutment of the shaft with the inner shoulder 34 at the lower end of the hub recess 28. A cap screw 35 is passed upwardly through the center hole 21 of the blade and the interior of the hub and is threaded into a tapped opening 36 provided therefor in the shaft end.

In order to lock the cap screw 35 and to guard against undue tightening of the same in factory assembly, I prefer to use a Belleville washer 37 between the head of the cap screw and the blade 19. The drawings show such a washer as being dished, but it will be clear that other equivalent forms of the same, for example, a washer with a corrugated periphery, can be substituted. In the production of this mower, the cap screw 35 is tightened by a power tool and by proper selection of such a washer, the amount of apparent deformation of the same can be used to indicate the proper degree of tightening to the workman.

A V-shaped slot 38 is formed in the outer surface of the cylindrical section 23 of the hub and extends from the upper end of the same parallel to the hub axis approximately one half of the over-all hub length, so that this extension of the hub has a longitudinally extending wall section of reduced thickness. As best shown in FIG. 4, the bottom of this slot or groove is angularly displaced approximately 45° from a radius which passes through the center of the hub key 31, and the included angle of the groove is approximately 90°. It will also be apparent that the thickness of the hub wall in a radial plane along the bottom of the groove is reduced by slightly more than one-half.

This hub has been made of zinc, as a die casting, whereby it has a chilled or hard exterior and a generally malleable or ductile interior. Numerous tests have shown that such hub splits longitudinally along the line defined partially by the groove 38 when the blade strikes a stationary object, without damage to the engine shaft 18, whereby the portion of this hub in which the groove is located serves as a shear section effective to cause such splitting upon development of predetermined torque in the same. In such testing, a mower equipped with the described hub and blade assembly has been moved with the blade operating at full speed over an iron stake driven firmly into the ground; the hub splits fully as indicated and of course deforms, and this shearing action prevents the transmission of the excessive torsional stress to the engine shaft. The same test has, as a matter of fact, been conducted many times with the same shaft without fracture.

While the hub splits on striking a stationary object, it does not fail on scalping or when the blade encounters relatively movable objects. The particular configuration of the blade will be seen to reduce the extent of the drive shaft which must project unsupported to the point of the connection thereto, and accordingly the mechanical strength is enhanced, as compared to an assembly using a straight blade and hence requiring a longer shaft.

Other modes of applying the principle of the invention may be employed, change being made as regards the details described, provided the features stated in any of the following claims or the equivalent of such be employed.

I, therefore, particularly point out and distinctly claim as my invention:

1. In a rotary mower having a drive shaft and a cutting blade adapted for connection thereto, a hub secured to said blade at the region of connection thereof to the shaft, said hub being formed with an extension which fits on the end of the drive shaft, means interengageable between the shaft and such extension of the hub rotatively to lock the two for drive of the hub by the shaft, and means connecting the blade with the hub attached and thus drivingly engaged to the shaft, the extension of said hub having a longitudinally extending wall section of such reduced thickness that the hub will shear therealong in response to predetermined torsional stressing of the same, thereby to protect the drive shaft from excessive torque in the event that the blade strikes a relatively unyielding object in operation of the mower.

2. In a rotary mower, the combination set forth in claim 1 characterized further in that said hub is made of metal with a relatively hard exterior and a relatively ductile interior.

3. In a rotary mower having a drive shaft, an elongated cutting blade, a hub secured to one side of said blade at the center thereof and having a generally cylindrical section which is fitted on the end of said drive shaft, means keying such section to the shaft for rotative drive of the hub, and a fastening element extending through the blade center and into the shaft end within the hub to secure the blade and attached hub to the shaft, said hub having a longitudinally extending groove in said generally cylindrical section, the hub being weakened by such groove to shear therealong in response to predetermined torsional stress, thereby to protect the drive shaft in the event of excessive resistive torque in the driving connection.

4. In a rotary mower, the combination set forth in claim 3 characterized further in that said hub is made of metal with a relatively hard exterior and a relatively ductile interior.

References Cited in the file of this patent

UNITED STATES PATENTS

| | | |
|---|---|---|
| 871,389 | Cochran | Nov. 19, 1907 |
| 888,683 | Andrews | May 26, 1908 |
| 2,721,438 | O'Maley | Oct. 25, 1955 |
| 2,822,657 | Chaffee | Feb. 11, 1958 |
| 2,856,747 | Kolls | Oct. 21, 1958 |
| 2,862,376 | Thelander | Dec. 2, 1958 |
| 2,862,737 | Pearson | Dec. 2, 1958 |